United States Patent [19]

Khan et al.

[11] Patent Number: 4,469,846

[45] Date of Patent: Sep. 4, 1984

[54] CORE/SHELL FLUOROPOLYMER COMPOSITIONS

[75] Inventors: Ausat A. Khan; Charles W. Stewart, both of Newark, Del.

[73] Assignee: E. I. Du Pont de Nemours and Company, Wilmington, Del.

[21] Appl. No.: 496,537

[22] Filed: May 20, 1983

[51] Int. Cl.$^3$ ..................... C08F 259/08; C08L 51/06
[52] U.S. Cl. ..................................... 525/72; 525/276
[58] Field of Search ................................. 525/72, 276

[56] References Cited

U.S. PATENT DOCUMENTS

| | | | |
|---|---|---|---|
| 4,036,802 | 7/1977 | Poirier | 525/276 |
| 4,038,231 | 7/1977 | Downer et al. | 525/276 |
| 4,158,678 | 6/1979 | Tatemoto et al. | 260/884 |
| 4,243,770 | 1/1981 | Tatemoto et al. | 525/331 |
| 4,326,046 | 4/1982 | Miyaka et al. | 525/276 |

FOREIGN PATENT DOCUMENTS 2949907 6/1981 Fed. Rep. of Germany .

57-10895 3/1982 Japan .

OTHER PUBLICATIONS

M. H. Kaufman et al., Reinforcement of Fluoroelastomers with Halopolymers, Rubber Chemistry and Technology, Mar. 1963, 527–532.

*Primary Examiner*—Allan M. Lieberman
*Attorney, Agent, or Firm*—Paul R. Steyermark

[57] ABSTRACT

Core/shell fluoropolymer compositions in particulate form, wherein the core is a highly crystalline polymer such as, for example, tetrafluoroethylene, and the shell is an elastomeric fluoropolymer such as, for example, a vinylidene fluoride/hexafluoropropene copolymer, optionally also containing a cure site monomer are outstanding additives for uncured fluoroelastomer compositions, which after curing in the presence of dispersed core/shell fluoropolymers have improved tear strength, tear strength to modulus ratio, and certain other physical properties.

18 Claims, No Drawings

CORE/SHELL FLUOROPOLYMER COMPOSITIONS

BACKGROUND OF THE INVENTION

This invention relates to novel polymeric compositions which in one of their embodiments are polymer particles having a plastic core of a fluoropolymer such as polytetrafluoroethylene, poly(vinylidene fluoride), or polychlorotrifluoroethylene, and a shell surrounding the fluoropolymer core of an elastomeric fluoropolymer.

Particulate polymeric compositions having a core of one type of polymeric material and a shell of another type of polymeric material are known and are usually referred to as core/shell or core/sheath polymers. The polymeric materials forming the core and the shell usually have different chemical compositions; for example, they may be polymers of different monomers or copolymers of different proportions of the same monomers; or they may have the same compositions but different molecular weights. The core/shell polymers of the present invention have an elastomeric shell surrounding a crystalline, non-elastomeric core.

It is known that the tear strength of certain fluoroelastomers can be improved by dispersing in the fluoroelastomer matrix particles of polytetrafluoroethylene (PTFE), as taught in Japanese published application No. 56-10895 (1982) of Daikin Kogyo K.K. and as earlier discussed by Kaufman et al. in *Rubber Chemistry and Technology*, March 1963, pp. 527-532. While the Japanese inventors provide no information on the processability of their PTFE-filled compositions, Kaufman et al. observed that addition of PTFE to fluoroelastomers caused the compositions to lose their workability rapidly. Improvement of the tear strength thus is achieved at the expense of processability, which makes the technique impractical, a least at certain PTFE levels, for example above 10-15 weight percent of PTFE.

It would be very desirable to be able to disperse PTFE or another plastic fluoropolymer in a fluoroelastomer matrix at any desired level to achieve a significant improvement of tear strength without causing such undesirable changes. One possible approach would be to render the plastic fluoropolymer compatible with and readily dispersible in the fluoroelastomer by chemically modifying the polymer molecule.

U.S. Pat. No. 4,326,046 to Miyaka et al. discloses a modified PTFE which is made by first polymerizing tetrafluoroethylene (TFE) in an aqueous medium containing a dispersing agent, then copolymerizing TFE with an acid group-containing fluoromonomer in the presence of the homopolymer made in the first step. The resulting polymeric material has a core/shell structure.

U.S. Pat. No. 4,158,678 to Tatemoto et al. describes segmented polymers, which are made in the presence of an iodine-containing organic compound. The segmented polymers thus are terminated at one end by an iodine atom and at the other end by the remaining radical of the initial iodine-containing organic compound. At least one segment contains fluorine atoms, and the molecular weight of each segment is no less than 10,000, one segment having a molecular weight of at least 30,000. The first segment may be, among others, tetrafluoroethylene or vinylidene fluoride; and other segments may be, for example, a copolymer or vinylidene fluoride and hexafluoropropylene. The adjacent segments of those polymers are bonded to one another.

German published application OS No. 2,949,907 of Hoechst AG describes core/inner shell/outer shell polymers in which the core is a slightly modified TFE polymer; the inner shell is TFE homopolymer; and the outer shell is a TFE copolymer with another fluoromonomer.

The modified polymers of U.S. Pat. No. 4,326,046 are said to be particularly suitable in reinforcing cation exchange resin membranes. The core/shell polymers of the patent are easily fibrilated. The polymers of the German publication are suitable for improving certain paste-extrudable resins. At higher levels they would not function as fluoroelastomer additives to improve tear strength.

SUMMARY OF THE INVENTION

According to this invention, there is provided a particulate core/shell polymeric composition wherein the particle core is a plastic fluoropolymer selected from polymers of tetrafluoroethylene, vinylidene fluoride, and chlorotrifluoroethylene, said polymer containing about 0-3 weight percent of another comonomer, and the particle shell is an elastomeric copolymer of a fluorinated monomer with at least one other monomer, the core:shell weight ratio being about 95:5 to 5:95; the average particle size being about 0.05-1 $\mu$m; and the average core size being about 0.01-0.4 $\mu$m, preferably 0.03-0.3 $\mu$m.

There also are provided uncured fluoroelastomer compositions having particulate core/shell polymeric compositions of the present invention dispersed therein as well as fluoroelastomers having improved physical properties obtained by curing those uncured compositions.

DESCRIPTION OF THE INVENTION

The core of the particulate polymer compositions of the present invention is either a homopolymer of tetrafluoroethylene, vinylidene fluoride (VF$_2$), or chlorotrifluoroethylene or a copolymer with a minor amount of another monomer, up to about 3% of the total core weight, which can be, among others, a fluoromonomer; for example, a perfluoroolefin such as hexafluoropropene, a perfluoroether such as perfluoro(propyl vinyl ether) and perfluoro(methyl vinyl ether), a fluoroolefin such as (perfluorobutyl)ethylene and VF$_2$, and a perfluorodioxole such as perfluoro(1,3-dioxole) and perfluoro(2,2-dimethyl-1,3-dioxole); or an olefin such as isobutylene, ethylene, or propylene. Preferably, the number average molecular weight of the core polymer should be at least 250,000 because such cores provide the best improvement of the tear strength of the fluoroelastomer matrix in which they are dispersed.

Homopolymerization of TFE is carried out in aqueous emulsion according to known art; see, for example U.S. Pat. No. 3,391,099 to Punderson, U.S. Pat. No. 4,342,675 to Gangal, and U.S. Pat. No. 3,825,577 to Lalu et al. Any suitable emulsifying agent such as a perfluoroalkylcarboxylic acid, etc. can be used, but the best emulsifier is a telomerized fluoroalkylsulfuric or fluoroalkylsulfonic acid or a water-soluble salt thereof, represented by the respective formulas F(CF$_2$CF$_2$)$_n$CH$_2$CH$_2$OSO$_3$M and
F(CF$_2$CF$_2$)$_n$CH$_2$CH$_2$SO$_3$M, where M is H, Li, K, Na, or NH$_4$; both types described in U.S. Pat. No. 4,381,384 of A. A. Khan. This polymerization can be either a batch process or a continuous process, which can be carried out at either atmospheric or superatmospheric pressure. A colloidal dispersion of core particles of TFE polymer is thus produced. Normally a monomer conversion of at least 60% is necessary to obtain polymer particles of sufficient size.

The term "plastic", as used herein, has its normal meaning, that is, deformable but not elastic and usually possessing some crystallinity. Normally, the plastic core polymer will have a crystallinity of about 50% or higher.

The term "elastomeric" also has its normal meaning, that is, the material, after being stretched to twice its normal length and released will return with force to substantially its original length.

The shell copolymer is prepared in the presence of the particles of the core polymer. This again can be done either in a batch process or in a continuous process. Typical shell polymers include, for example, the following: dipolymers of VF$_2$ with hexafluoropropene (HFP), terpolymers of VF$_2$ with HFP and TFE, dipolymers of VF$_2$ with perfluoro(alkyl vinyl ethers), terpolymers of VF$_2$ with TFE and perfluoro(methyl vinyl ether), dipolymers of TFE with perfluoromethyl vinyl ether, dipolymers of TFE with propylene, dipolymers or ethylene with perfluoro(alkyl vinyl ethers), and terpolymers of ethylene with TFE and with perfluoro(alkyl vinyl ethers).

The shell copolymer may, in addition, contain a small amount of a monomer which supplies cure sites. Typical cure site monomers are
bromotrifluoroethylene;
3,3,4,4-tetrafluoro-4-bromo-1-butene;
perfluoro(8-cyano-5-methyl-3,6-dioxa-1-octene);
perfluoro(2-phenoxypropyl vinyl ether); and
perfluoro(4-cyanobutyl vinyl ether).

Particularly preferred shell polymers are copolymers of VF$_2$ with HFP, terpolymers of VF$_2$ and TFE with HFP, and copolymers of TFE with propylene.

The core/shell polymerization may be carried out, for example, in a series of two continuous reactors arranged in a cascade, where the core polymer is produced in the first reactor, and the effluent from the first reactor is introduced into the second reactor along with other monomers to produce the shell polymer; or in a batch system where the core polymer is produced first, and the shell monomers are introduced and polymerized after the core polymerization is completed. The unchanged core monomer may be either left in the reactor or removed, depending on the desired shell polymer composition. Optionally, the core polymer dispersion can be produced and stored until needed. It then can be reintroduced into the same or different polymerization reactor, where the shell monomers are introduced to carry out the polymerization. All variants of such processes generally are known; see, for example, Kuhl et al., German Pat. No. 2,949,907, and Poirier, U.S. Pat. No. 4,036,802.

Polymerization of fluoromonomers in aqueous emulsion is a free-radical-initiated reaction. Suitable free radical generators are various peroxides, peroxy esters, and persulfates, especially ammonium and potassium persulfates.

Because tetrafluoroethylene and several suitable fluorocomonomers are gases at normal temperature, the polymerization will usually be carried out in a closed system either under autogeneous pressure or in pressurized vessels. The polymerization temperature usually is in the range of about 50° to 130° C.

The core/shell polymers of the present invention are recovered from their dispersion following coagulation with a salt such as, for example, calcium nitrate or potassium aluminum sulfate. The polymeric product is conveniently dried in an air-circulating oven at a temperature from about 50° C. to about 120° C.

One of the most important applications of the core/shell polymeric compositions of the present invention is as a blending component which, when added to certain fluoroelastomers, improves the tear resistance of cured elastomer without causing significant increase of modulus. These core/shell polymeric compositions should be compatible with the host (or matrix) fluoroelastomer to a sufficient degree to permit the blend to form a uniform and stable dispersion, which will maintain good processability. For example, core/shell polymeric compositions in which the shell polymer is a copolymer of VF$_2$ with HFP or a terpolymer of VF$_2$ with HFP and TFE is compatible with a copolymer of VF$_2$ with HFP. The amount of core/shell polymer particles in such dispersions in fluoroelastomers will normally vary from about 2 to about 50% based on the weight of fluoroelastomer matrix. The improvement of the tear strength of cured fluoroelastomer may not be sufficient below the lower limit, while above the upper limit additional improvement, if any, would be at most marginal and would not justify the expense. The most significant improvement is obtained when the amount of the core in a blend of core/shell polymer with fluoroelastomer is at least 15% based on the weight of fluoroelastomer matrix. Another important physical property of fluoroelastomers which also is improved by blending with core/shell polymers of this invention is their ratio of tear strength to modulus. Thus, if, as often is the case, an article of a specific modulus is desired, this invention permits an improvement of the tear strength of such an article.

The improvement of tear strength as well as of other physical properties of fluoroelastomers according to this invention is achieved without sacrificing other properties of the elastomer material. In addition, the cured fluoroelastomers reinforced by the addition of the core/shell polymers of this invention have improved flex life and abrasion resistance as well as improved ability to remove finished articles from molds, especially in the case of complicated moldings. Finished articles, such as o-rings and seals produced from such blends exhibit superior properties, especially in the areas of tear resistance, flex life, and abrasion resistance.

Cured core/shell polymers of this invention themselves have good physical properties and can be used in various applications as such, for example, in making o-rings and seals.

Although the particulate compositions of the present invention are presumed to be core/shell polymers, no direct proof of such structure has in fact been obtained, but the structure is merely inferred from the process by which they are made as well as from the properties of the particles. It is not known, for example, whether the shell layer is continuous or discontinuous, smooth or hair-like, bonded to the core or merely mechanically surrounding it.

The particulate core/shell compositions of the present invention act as fillers for fluoroelastomers. They can be blended into the fluoroelastomer matrix together with other fillers especially those conventionally used in compounding elastomers, for example, carbon black, talc, calcium carbonate, barium sulfate, clay, titanium dioxide, silica powder, alumina, etc; or they can be blended with fluoroelastomer in latex form. Fluoroelastomers which are improved by the addition of the core/shell particles of the present invention include, among others, the following: $VF_2$/HFP copolymers, $VF_2$/perfluoro(alkyl vinyl ether) dipolymers, $VF_2$/TFE/perfluoro(methyl vinyl ether) terpolymers, $VF_2$/HFP/TFE terpolymers, TFE/propylene copolymers, TFE/perfluoro(methyl vinyl ether) copolymers, ethylene/perfluoro(alkyl vinyl ether) copolymers, and ethylene/TFE/perfluoro(alkyl vinyl ether) terpolymers. All such di- and terpolymers may, in addition, contain cure site monomers, which may be selected, for example, from those used in shell polymers, as explained above. Blending is accomplished in conventional equipment, such as, for example, Banbury mixers, rubber mills, or continuous internal mixers.

Fillers, pigments, stabilizers, antioxidants, and curing agents normally used in fluoroelastomer compounds are used in their usual amounts.

This invention is now illustrated by the following examples of certain representative embodiments thereof, where all parts, proportions, and percentages are by weight, unless otherwise indicated:

GENERAL PROCEDURE FOR POLY TFE CORE/ELASTOMERIC SHELL POLYMERS

Polymerization is carried out in two jacketed agitated stainless steel autoclaves operated in series. The first reactor, of approximately four liter volume is fed gaseous TFE monomer and chloropentafluoroethane diluent via a compressor and a solution of telomeric fluorosulfuric or fluorosulfonic surfactant of the above-discussed types or a water-soluble salt thereof and initiator (ammonium persulfate) dissolved in deionized, deaerated water. All feeds to the reactor enter the bottom while discharge from the reactor is from the top in order to maintain an essentially liquid full system. The effluent from the first reactor is fed to the bottom of the second reactor of approximately two liter volume. Also fed to the bottom of the second reactor are gaseous vinylidene fluoride ($VF_2$) and hexafluoropropylene (HFP) from a second compressor and additional surfactant, initiator and water, as well as isopropyl alcohol for molecular weight control, from a second liquid pump. The effluent exits from the top of the second reactor through a let down valve to an atmospheric pressure degasser where unchanged monomer and chloropentafluoroethane diluent are separated from the polymer dispersion. The four liter reactor is started up first and allowed to run a goal feed rates until steady state is established. Conversion in this reactor is then calculated from the off-gas analysis. Since measurement of the conversion in this reactor is not possible after the second reactor is started up, it is assumed that it does not deviate from the initial measured steady state value. Feeds are then started to the second reactor, and the entire reactor system is allowed to reach steady state.

Polymer composition produced in the second reactor is either measured on extracted, isolated shell polymer or inferred from the results of trial runs in the second reactor alone made under comparable conditions but without the feed of polymer from the first reactor to the second. The "core" content is determined by extraction with methyl ethyl ketone of all soluble polymer from a sample. The core material is not soluble in this solvent. Core molecular weight is calculated from standard specific gravity (SSG) as determined according to ASTM D-1457-62T, by applying the following formula:

$$\log M_n = 44.82 - 17.15(SSG)$$

Instead of running the standard specific gravity tests on all cores, a relationship was established between the molecular weight based on SSG and the heat of crystallization from the melt as determined by differential scanning calorimetry (DSC), using core materials produced in the experimental reactor. Unknown samples were then handled by performing DSC tests on samples of extracted core and using the following empirical relationship:

$$M_n = 9.53 \times 10^{10} \Delta H_c^{-5.16},$$

where $\Delta H_c$ is in cal/g.

Core crystallinity is determined by measuring the heat of fusion of the extracted core material by DSC, dividing by the value for 100% crystalline polymer (93.0 kJ/kg for PTFE) and multiplying by 100. See, e.g., Starkweather et al., J. Poly. Sci., Polymer Phys. Ed. 20, 751 (1982).

The core particle size can be determined either directly after the core particles are made or following the extraction of the shell polymer. The particle sizes of both the core alone and the core/shell polymer are best determined by light scattering (photon correlation spectroscopy), as described in Dynamic Light Scattering, B. Burne et al., Wiley, New York (1976). Core size was in all experiments about 0.20 $\mu$m, and core/shell particle size about 0.25 $\mu$m.

Core content where given, is expressed as weight %, based on the weight of matrix fluoroelastomer.

EXAMPLE 1

During this polymerization, the following conditions prevailed:

|  | 4 liter core reactor | 2 liter shell reactor |
|---|---|---|
| Agitator Speed (rpm) | 500 | 800 |
| Temperature (°C.) | 95 | 105 |
| Pressure (MPa) | 6.21 | 6.21 |
| Monomer Feed (g/hr): |  |  |
| TFE | 500 | — |
| $VF_2$ | — | 780 |
| HFP | — | 580 |
| Chloropentafluoroethane | 437 | — |
| Aqueous Feeds: |  |  |
| Ammonium persulfate (g/hr) | 0.02 | 4 |
| Telomeric fluorosulfonic acid surfactant (g/hr) | 20 | 6 |
| Isopropyl alcohol (g/hr) | — | 3.5 |
| Water (L/hr) | 4 | 4 |
| Conversion (%), in first reactor | 92.3 |  |
| Core Content (%) | 58 |  |
| Molecular weight of core, Mn | 513,000 |  |
| core crystallinity (%) | 74 |  |
| Shell Composition (%): |  |  |
| $VF_2$ | 65 |  |
| HFP | 15 |  |
| TFE | 20 |  |

Polymer product was coagulated and filtered, washed several times with hot water to remove residual surfactant, filtered again and dried.

SAMPLE PREPARATION

Samples of the above core/shell polymer were mixed with a $VF_2/HFP$ 60:40 copolymer, fillers and curatives on a two roll rubber mill according to the following recipe.

| Sample | A | B | C | D | E | F |
|---|---|---|---|---|---|---|
| $VF_2/HFP$ copolymer | 96 | 84 | 78 | 74 | 71 | 96 |
| Example 1 polymer | — | 22 | 33 | 43 | 54 | — |
| PTFE core polymer alone | — | — | — | — | — | 20 |
| MT Black | 30 | 5 | 5 | 5 | 5 | 5 |
| $Ca(OH)_2$ | 6 | 6 | 6 | 6 | 6 | 6 |
| MgO | 3 | 3 | 3 | 3 | 3 | 3 |
| Additive 1* | 1.28 | 1.28 | 1.28 | 1.28 | 1.28 | 1.28 |
| Additive 2** | 2.8 | 2.8 | 2.8 | 2.8 | 2.8 | 2.8 |
| phr PTFE | 0 | 14 | 21 | 27 | 33 | |

*a 2:1 blend of a $VF_2/HFP$ copolymer with benzyltriphenylphosphonium chloride
**a 48:50:2 blend of a $VF_2/HFP$ copolymer with bisphenol AF and rice bran wax After mixing, sheets were formed and press-cured at 177° C. for 15 minutes, then post-cured at 232° C. for 24 hours.

TESTING

Samples were died out from the cured sheet and tested for tear strength at room temperature according to ASTM method B624B and for tensile properties at room temperature according to ASTM method D412. Measurements were made both in the direction of mill rotation and transverse direction and then averaged.

| Sample | A | B | C | D | E | F |
|---|---|---|---|---|---|---|
| Tear Strength (kN/m) | 25 | 26 | 28 | 52 | 47 | 22 |
| $M_{100}$ (MPa) | 3.3 | 2.8 | 2.4 | 5.6 | 3.5 | 2.6 |
| $T_B$ (MPa) | 10.3 | 9.3 | 8.3 | 8.6 | 6.0 | 7.8 |
| $E_B$ (%) | 240 | 350 | 365 | 240 | 265 | 350 |
| Tear Strength/$M_{100}$ | 7.5 | 9.5 | 11.6 | 9.2 | 13.5 | 8.5 |

All compounds processed well providing smooth, rubbery, homogeneous appearing slabs and test pieces. The control compound (A) is a representative commercial $VF_2/HFP$ copolymer formulation. While samples B and C provided only a modest improvement of tear strength reactive to the control, samples D and E provided a very significant improvement of tear strength. All samples of the invention (B through E) had an improved ratio of tear strength to modulus while suffering no loss in processibility, ultimate elongation or elastomeric character.

Comparison of runs C and F, wherein the amounts of core polymer added to the compositions were about the same, shows the advantage of using a core/shell polymer additive instead of core polymer alone. In the former case, the tear strength was increased by 12% and the tear strength-to-modulus ratio was increased by 55%. In the latter case, the tear strength was reduced by 12%, and the tear strength-to-modulus ratio was increased by 13%.

EXAMPLE 2

The following conditions prevailed during this polymerization:

| | 4 L core reactor | 2 L shell reactor |
|---|---|---|
| Agitator Speed (rpm) | 500 | 700 |
| T (°C.) | 69 | 113 |
| P (MPa) | 6.21 | 6.21 |
| Monomer Feeds (g/hr): | | |
| TFE | 500 | — |
| $VF_2$ | — | 780 |
| HFP | — | 638 |
| Chloropentafluoroethane | 363 | — |
| Aqueous Feeds: | | |
| Ammonium persulfate (g/hr) | 0.10 | 8 |
| Telomeric ammonium fluorosulfonate surfactant (g/hr) | 10 | 6 |
| Water (L/hr) | 4 | 4 |
| Conversion (%) in first reactor | 96.4 | |
| Core Content (%) | 39 | |
| Mn of core | 490,000 | |
| Core of crystallinity (%) | 72 | |
| Shell Composition (%): | | |
| $VF_2$ | | 67 |
| HFP | | 28 |
| TFE | | 5 |

Compounds were prepared and tested as in Example 1 except for the proportions of carbon black and polymer of the invention:

| Sample | A | B | C | D | E |
|---|---|---|---|---|---|
| $VF_2/HFP$ copolymer | 96 | 80 | 72 | 80 | 72 |
| Core/shell Polymer | — | 26 | 39 | 26 | 39 |
| MT Black | 30 | 15 | 15 | 20 | 20 |
| $Ca(OH)_2$ | 6 | 6 | 6 | 6 | 6 |
| MgO | 3 | 3 | 3 | 3 | 3 |
| Additive 1* | 1.28 | 1.28 | 1.28 | 1.28 | 1.28 |
| Additive 2** | 2.8 | 2.8 | 2.8 | 2.8 | 2.8 |
| Core content (%) | 0 | 10 | 15 | 10 | 15 |
| Tear Strength (kN/m) | 27 | 26 | 32 | 29 | 31 |
| $M_{100}$ (MPa) | 3.1 | 2.4 | 2.9 | 2.8 | 3.1 |
| $T_B$ (MPa) | 11.7 | 10.3 | 10.2 | 11.0 | 11.4 |
| $E_B$ (%) | 290 | 360 | 340 | 355 | 340 |
| Tear Strength/$M_{100}$ | 8.6 | 10.8 | 10.8 | 10.5 | 9.9 |

*see footnote to Table in Example 1
**see footnote to Table in Example 1

Again, the processing and appearance of all samples was excellent. The different compounding formulation used here, as compared to the previous example, has permitted improvements in tear strength and ultimate elongation while providing a close match to the control in tensile properties.

EXAMPLE 3 (COMPARATIVE)

This example illustrates the behavior of $VF_2/HFP$ compounds when commercial PTFE powder of high molecular weight (Mn=50 million) or low molecular weight (Mn=50,000), as directly determined by SSG according to the above-indicated formula, is used as a filler. Again all compounding and testing was done as in previous examples.

| Sample | A | B | C | D | E |
|---|---|---|---|---|---|
| $VF_2/HFP$ copolymer | 100 | 100 | 100 | 100 | 100 |
| High m.w. PTFE | — | 5 | 15 | 15 | — |
| Low m.w. PTFE | | | | | 15 |
| MT Black | 30 | 25 | 15 | 30 | 30 |
| $Ca(OH)_2$ | 6 | 6 | 6 | 6 | 6 |
| MgO | 3 | 3 | 3 | 3 | 3 |
| Additive 1* | 1.28 | 1.28 | 1.28 | 1.28 | 1.28 |
| Additive 2** | 2.8 | 2.8 | 2.8 | 2.8 | 2.8 |
| Tear Strength (kN/m) | 37 | 64 | 74 | 100 | 24 |
| $M_{100}$ (MPa) | 4.2 | 7.7 | 9.4 | 13.5 | 2.9 |
| $T_B$ (MPa) | 10.6 | 11.0 | 13.7 | 14.8 | 10.2 |

-continued

| Sample | A | B | C | D | E |
|---|---|---|---|---|---|
| $E_B$ (%) | 270 | 240 | 195 | 115 | 225 |
| Tear Strength/$M_{100}$ | 8.7 | 8.3 | 7.8 | 7.4 | 8.2 |

*see footnote to Table in Example 1
**see footnote to Table in Example 1

Those samples containing high molecular weight PTFE mixed poorly on the mill resulting in inhomogeneous appearing samples with clumps of undispersed PTFE distributed throughout the sample.

Vulcanized slabs lost most of their rubbery feel and appeared more plastic in nature. While tear strength was greatly increased, it was only at the cost of a proportionately greater increase in modulus and dramatic loss in ultimate elongation. Such compounds would be difficult or impossible to process commercially and would not produce articles with the same utility as the conrol.

The sample with low molecular weight PTFE added (E) processed well and retained its elastomeric character but failed to produce any improvement in vulcanizate properties relative to the control.

EXAMPLE 4

This example illustrates a PVF$_2$ core with a VF$_2$/HFP shell. The reaction system is similar to Example 1 except, that each reactor has a volume of about 2 liters.

|  | Core reactor | Shell reactor |
|---|---|---|
| Agitator Speed (rpm) | 1200 | 885 |
| T (°C.) | 115 | 115 |
| P (MPa) | 6.21 | 6.21 |
| Monomer Feeds (g/hr): | | |
| VF$_2$ | 1500 | 825 |
| HFP | — | 675 |
| Aqueous Feeds: | | |
| Ammonium persulfate (g/hr) | 7.25 | 7.25 |
| Telomeric sodium fluoro-sulfate surfactant (g/hr) | 50 | 50 |
| Na$_2$HPO$_4$.7H$_2$O (g/hr) | 8.5 | 8.5 |
| Water (L/hr) | 8 | 8 |
| Conversion (%) in the first reactor | 95.8 | |
| Core Content (%) | 52 | |
| Mn of core | 100,000–250,000 | |
| Shell Composition (%): | | |
| VF$_2$ | | 60 |
| HFP | | 40 |

Samples were compounded as indicated and press cured for 10 minutes at 177° C. and post-cured for 24 hours at 232° C.

| Sample | A | B | C |
|---|---|---|---|
| 60/40 copolymer of VF$_2$ and HFP | 70 | 100 | 100 |
| Core/shell Polymer | 60 | — | — |
| PVF$_2$ core alone | — | 30 | — |
| MT Black | — | — | 30 |
| MgO | 3 | 3 | 3 |
| Ca(OH)$_2$ | 6 | 6 | 6 |
| Benzyltriphenylphosphonium chloride | 0.55 | 0.55 | 0.55 |
| Bisphenol AF | 2 | 2 | 2 |
| Room Temperature Tests: | | | |
| $M_{100}$ (MPa) | 8.3 | 5.2 | 6.4 |
| $T_B$ (MPa) | 15.5 | 13.4 | 12.4 |
| $E_B$ (%) | 265 | 280 | 200 |
| Tear Strength (ASTM D470, kN/m) | 6.7 | 4.9 | 3.6 |

-continued

| Sample | A | B | C |
|---|---|---|---|
| Tests at 150° C.: | | | |
| $M_{100}$ (MPa) | 4.1 | 3.3 | — |
| $T_B$ (MPa) | 6.2 | 4.0 | 4.1 |
| $E_B$ (%) | 160 | 120 | 60 |
| Tear Strength (ASTM D470, kN/m) | 1.1 | 0.5 | 0.5 |
| Compression Set, O-ring 70 hr/204° C. (%) | 16.2 | 49 | 18.1 |

The polymer of the invention (A) provides greatly improved tear strength at 150° C. PVF$_2$ (B) alone improves tear strength at room temperature but loses its advantage at 150° C. and suffers from high compression set.

EXAMPLE 5

In this case the core is polytetrafluoroethylene and the shell a TFE/VF$_2$/HFP terpolymer. The experimental data are given below:

|  | 4 liter core reactor | 2 liter shell reactor |
|---|---|---|
| Agitator Speed (rpm) | 800 | 800 |
| Temperature (°C.) | 95 | 115 |
| Pressure (MPa) | 6.21 | 6.21 |
| Monomer Feed (g/hr): | | |
| TFE | 850 | — |
| VF$_2$ | — | 885 |
| HFP | — | 615 |
| Chloropentafluoroethane | 570 | — |
| Aqueous Feeds: | | |
| Ammonium persulfate (g/hr) | 1.25 | 3.0 |
| Telomeric ammonium fluoro-sulfate surfactant (g/hr) | | 17.3 |
| Na$_2$HPO$_4$.7H$_2$O (g/hr) | 1.2 | — |
| Water (L/hr) | 6 | 2 |
| 2-propanol (g/hr) | — | 1.31 |
| Core Content (%) | 37 | |
| Mn of core | 300,000 | |
| Core crystallinity (%) | 73 | |

Compounds were prepared on a two roll rubber mill according to the following recipe:

|  | A (Control) | B |
|---|---|---|
| 35% VF$_2$/34% HFP/29% TFE/1.8% bromotrifluoroethylene tetrapolymer | 100 | 100 |
| Core/shell polymer | — | 50 |
| MT | Black | 30 |
| PbO | 3 | 3 |
| Triallyl isocyanurate | 3 | 3 |
| 45% 2,5-dimethyl-2,5-bis(tert butyl peroxy)hexane | 3 | 3 |

Slabs were press cured for 15 minutes at 177° C. and postcured for 24 hours at 232° C. When tested at 24° C. the following results were obtained.

|  | A (Control) | B |
|---|---|---|
| Tear strength (kN/m) | 29 | 41 |
| $M_{100}$ (MPa) | 4.44 | 4.95 |
| $T_B$ (MPa) | 14.52 | 9.25 |
| $E_B$ (%) | 250 | 285 |

In addition samples were molded in a series of complex shape test molds designed to test demoldability under conditions corresponding to the first stage of the above cure (15 minutes at 177° C.). The molds were then opened and samples removed. In all cases the moldings containing the core/shell polymer of the invention according to formulation B above were demolded with no damage, while the control moldings suffered severe damage, including torn pieces.

EXAMPLE 6

In this example the core was a copolymer of TFE with perfluoro(propyl vinyl ether) and the shell a terpolymer of TFE with $VF_2$ and HFP. The experimental data are given in the following table:

|  | 4 liter core reactor | 2 liter shell reactor |
|---|---|---|
| Agitator Speed (rpm) | 500 | 800 |
| Temperature (°C.) | 95 | 101 |
| Pressure (MPa) | 6.21 | 6.21 |
| Monomer Feeds (g/hr): |  |  |
| TFE | 500 | 225 |
| $VF_2$ | — | 700 |
| HFP | — | 450 |
| Perfluoropropylvinyl ether (PPVE) | 8 | — |
| Chloropentafluoroethane | 250 | — |
| 1,2,2-trichloro-1,1,2-trifluoroethane | 22 | — |
| Aqueous Feeds: |  |  |
| Ammonium persulfate (g/hr) | 0.7 | 0.3 |
| Telomeric fluorosulfonic acid surfactant (g/hr) | 20 | — |
| Ammonium carbonate (g/hr) | 0.3 | — |
| 2-propanol (g/hr) | — | 1.3 |
| Water (L/hr) | 4 | 4 |
| Core Content (%) | 23 |  |
| Mn of core | — |  |
| Composition | core 98 TFE 2 PPVE | shell 25 TFE 49 $VF_2$ 25 HFP |

Compounds were prepared according to the following recipe:

|  | A (Control) | B |
|---|---|---|
| 60% $VF_2$/40 HFP copolymer | 96 | 79 |
| Core/shell Polymer of the example | — | 22 |
| MT Black | 30 | 30 |
| MgO | 3 | 3 |
| Ca(OH)$_2$ | 6 | 6 |
| Additive 1* | 1.26 | 1.26 |
| Additive 2* | 2.8 | 2.8 |

*See Example 1

Slabs were press cured for 15 minutes at 177° C. and postcured for 24 hours at 232° C. Room temperature test results were as follows:

|  | A (Control) | B |
|---|---|---|
| Tear strength (kN/m) | 10.5 | 11.6 |
| $M_{100}$ (MPa) | 2.1 | 2.5 |
| $T_B$ (MPa) | 3.2 | 4.3 |
| $E_B$ (%) | 130 | 190 |
| Tabor abrasion test |  |  |
| H18 wheel, 1 kg weight weight loss (g/M cycles) | 0.26 | 0.17 |
| Flex life (cycles) |  |  |
| can #14 | 5000 | 14,000 |
| can #14 | 90 | 206 |

The core/shell polymer of this example, when used as an additive in this fluoroelastomer compound, confers added abrasion resistance and flex life to the final vulcanizate.

EXAMPLE 7 (COMPARATIVE)

A core/shell polymer was prepared under the following conditions:

|  | 4 liter core reactor | 2 liter shell reactor |
|---|---|---|
| Agitator Speed (rpm) | 500 | 700 |
| Temperature (°C.) | 71 | 103 |
| Pressure (MPa) | 6.21 | 6.21 |
| Monomer Feed (g/hr): |  |  |
| TFE | 667 | — |
| $VF_2$ | — | 580 |
| HFP | — | 680 |
| Chloropentafluoroethane | 484 | — |
| Aqueous Feeds: |  |  |
| Ammonium persulfate (g./hr) | 0.2 | 4.0 |
| Telomeric fluorosulfonic acid surfactant (g/hr) | 10.4 | 6.0 |
| Water (L/hr) | 4 | 4 |
| Conversion in first reactor (%) | 99 |  |
| Core Content (%) | 49 |  |
| Molecular weight, Mn, of core | 50,000 |  |
| Core crystallinity | — |  |
| Shell composition (%), estimated |  |  |
| $VF_2$ |  | 57 |
| HFP |  | 35 |
| TFE |  | 8 |

Compounds containing the above core/shell polymer were prepared and tested as in Example 1.

| Sample | A (Control) | B |
|---|---|---|
| 60% $VF_2$/40% HFP copolymer | 96 | 83 |
| Core/shell polymer | — | 28 |
| MT Black | 30 | 30 |
| Ca(OH)$_2$ | 6 | 6 |
| MgO | 3 | 3 |
| Additive 1* | 1.28 | 1.28 |
| Additive 2* | 2.80 | 2.80 |
| phr PTFE | 0 | 14 |
| Tear strength (kN/m) | 28 | 26 |
| Modulus, $M_{100}$ (MPa) | 3.4 | 4 |
| Tensile Strength, $T_B$ (MPa) | 14.8 | 11.5 |
| Elongation, $E_B$ (%) | 315 | 275 |
| Tear Strength/$M_{100}$ | 8.2 | 6.5 |

*See Example 1

As can be seen, when a core/shell polymer is made in which the PTFE core has a low molecular weight of 50,000, addition of such polymer to a $VF_2$/HFP elastomer does not improve the physical properties of the cured elastomer and in fact reduces both its tear strength and its tear strength/modulus ratio.

We claim:

1. A particulate polymeric composition consisting of a plastic portion of polymer selected from homopolymers of tetrafluoroethylene, vinylidene fluoride, and chlorotrifluoroethylene and copolymers of one of the above monomers with up to 3%, based on the copolymer weight, of another comonomer, said other comonomer being selected from the group consisting of perfluoroolefins, perfluoroethers, fluoroolefins, perfluorodioxoles, and olefins; the number average molecular weight of the plastic portion of polymer being at least 250,000, and the size of the plastic portion being about 0.01–0.4 μm;

and an elastomeric portion of a copolymer of a fluoromonomer with at least one other comonomer;

the weight ratio of the plastic portion to the elastomeric portion being about 95:5 to 5:95, and the particle size being about 0.05–1 μm; said composition being made by copolymerizing the comonomers of the elastomeric portion in the presence of particles of the polymer of the plastic portion.

2. A particulate composition of claim 1 wherein the size of the plastic portion is about 0.03–0.3 μm.

3. A particulate composition of claim 1 wherein the polymer of the plastic portion is a homopolymer of tetrafluoroethylene, which has a crystallinity of at least about 50%.

4. A particulate composition of claim 3 wherein the polymer of the elastomeric portion is a terpolymer of vinylidene fluoride with hexafluoropropene and tetrafluoroethylene.

5. A particulate composition of claim 1 wherein the polymer of the plastic portion is a homopolymer of vinylidene fluoride.

6. A particulate composition of claim 5 wherein the polymer of the elastomeric portion is a copolymer of vinylidene fluoride with hexafluoropropene.

7. A particulate composition of claim 1 wherein the polymer of the elastomeric portion contains cure sites introduced by a comonomer.

8. A particulate composition of claim 7 wherein the comonomer supplying cure sites is selected from the class consisting of bromotrifluoroethylene; 3,3,4,4-tetrafluoro-4-bromo-1-butene; perfluoro(8-cyano-5-methyl-3,6-dioxa-1-octene); perfluoro(2-phenoxypropyl vinyl ether); and perfluoro(4-cyanobutyl vinyl ether).

9. A particulate composition of claim 1 wherein the polymer of the elastomeric portion is selected from the class consisting of copolymers of vinylidene fluoride with hexafluoropropene, copolymers of vinylidene fluoride with perfluoro(alkyl vinly ethers), terpolymers of vinylidene fluoride with tetrafluoroethylene and hexafluoropropene, and copolymers of tetrafluoroethylene with propylene.

10. An uncured composition comprising a fluoroelastomer matrix having dispersed therein a compatible particulate composition of claim 1, the amount of said particulate composition being about 2–50% based on the weight of the fluoroelastomer matrix.

11. A composition of claim 10 wherein the amount of the dispersed particulate composition is such that the proportion of polymer of the plastic portion is at least about 15% based on the weight of the matrix fluoroelastomer.

12. A composition of claim 11 wherein the matrix fluoroelastomer is a copolymer of vinylidene fluoride with hexafluoropropene.

13. A composition of claim 12 wherein the polymer of the elastomeric portion of the dispersed particulate composition is a copolymer of vinylidene fluoride with hexafluoropropene or terpolymer of vinylidene fluoride with hexafluorpropene and tetrafluoroethylene.

14. An uncured composition of claim 10 wherein at least one of the matrix fluoroelastomer and of the particulate composition's polymer of the elastomeric portion contains a cure site monomer.

15. A composition of claim 14 wherein the cure site monomer is selected independently for the matrix and for the elastomeric portion from the class consisting of bromotrifluoroethylene; 3,3,4,4-tetrafluoro-4-bromo-1-butene; perfluoro(8-cyano-5-methyl-3,6-dioxa-1-octene); perfluoro(2-phenoxypropyl vinyl ether); and perfluoro(4-cyanobutyl vinyl ether).

16. A composition of claim 10 wherein the matrix fluoroelastomer is selected from the class consisting of copolymers of vinylidene fluoride with hexafluoropropene, copolymers of vinylidene fluoride with pefluoro(alkyl vinyl ethers), terpolymers of vinylidene fluoride with tetrafluoroethylene and hexafluoropropene, and copolymers of tetrafluoroethylene with propylene.

17. A composition obtained by curing a polymer composition of any of the claims 1 through 9.

18. An elastomeric composition obtained by curing a composition of any of the claims 10 through 16.

* * * * *